O. S. BLISS.
Steam Culinary Vessel.
No. 199,403.    Patented Jan. 22, 1878.
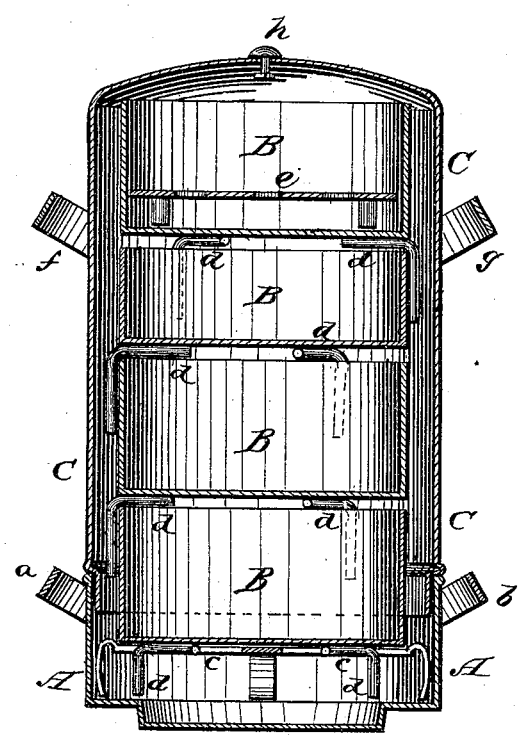
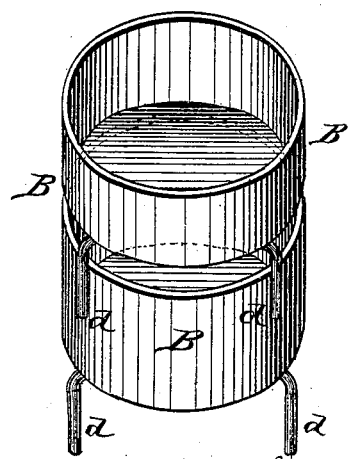
Witnesses:
Inventor:
Orville S. Bliss.
Per Charles E. Allen, Attorney.

UNITED STATES PATENT OFFICE.

ORVILLE S. BLISS, OF GEORGIA, VERMONT.

IMPROVEMENT IN STEAM CULINARY VESSELS.

Specification forming part of Letters Patent No. 199,403, dated January 22, 1878; application filed June 20, 1877.

*To all whom it may concern:*

Be it known that I, ORVILLE S. BLISS, of the town of Georgia, in the county of Franklin and State of Vermont, have invented certain new and useful Improvements in Steam Culinary Vessels; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to provide a steam culinary vessel which shall be simple in its arrangement, cheap and durable in its construction, economical in operation and in the space it occupies, and at the same time so well adapted to the purpose for which it is designed that food may be cooked within it in the most thorough, palatable, and nutritious manner by bringing it into direct contact with a water-vapor, which evenly, completely, and continuously penetrates the contents of each vessel separately, thereby retaining within it all the juices, nutriment, and flavor.

In the drawings, Figure 1 is a vertical central section of the culinary vessel. Fig. 2 is a perspective view of two of the interchangeable vessels, B B, resting one upon another, and separate from the culinary vessel.

A represents a cylindrical reservoir, to contain the water for generating the steam required. It is of any desired diameter, and is preferably constructed of copper. It has a pit-bottom, common to such vessels, to fit closely into the pot-hole of the stove or range for the purpose of presenting a greater exposure of heating-surface to the fire, and at the same time giving the bottom section of the culinary vessel the advantage of greater stability and firmness. Handles $a$ and $b$ are attached to each side to move it.

Within the steam-generator A a metallic rack, $c$, is placed, to keep in a central position and sustain the series of interchangeable sections or vessels B B, which rest upon each other, and are intended to contain the articles to be cooked. The sections or vessels B B are cylindrical in form, of less diameter than the bottom section A, with flat bottoms and open tops, and made of tin or other suitable metal.

Attached to and projecting out from the bottom of each section or vessel are metallic supports $d\ d$, which are bent downward to form a shoulder. These supports $d\ d$, with their projected shoulders extended down over the outside of the vessel immediately below, serve to hold it in firm position, and give steadiness to the whole series, and also to afford the necessary openings between the vessels for the admission of steam to each. They also answer the purpose of feet when the vessels are used apart from the culinary, and as such may be made ornamental in shape. A perforated false bottom or rack, $e$, may be inserted, if required, into any of the sections B B, upon which the articles to be cooked are placed. This is elevated sufficiently above the bottom of the vessel to permit the fluids which result from the process of cooking to fall. Over all the series of vessels thus resting upon the rack $c$ in the steam-generator A a metallic case, C, is inverted. It is lifted in and out of place by the handles $f$ and $g$ on either side near the top. This case is closed at the top, except an aperture, which is controlled by an air-valve, $h$. It is open at the bottom, and is made to fit tightly into the top of the steam-generator A, thus forming a common cover to all of the vessels.

In operation, the complete culinary vessel is placed over the fire, the steam-generator A being filled with water, and the series of vessels B B placed above, and containing the articles to be cooked. As the temperature of the water is elevated the steam is generated, and, rising, is confined within the outside case C, and presses by its own expansion into each vessel, upon every side equally, through the open spaces between them, so that each vessel becomes entirely surrounded by and permeated with a bath of steam, thereby securing the entire benefit of the steam, and avoiding all injurious effects upon the contents of the vessels, which are caused by the condensation which would otherwise result from the exposure of the outside of the vessels to the exterior atmosphere. The excess or surplus of steam escapes through the valve $h$ in the top of the case C.

What I claim, and desire to secure by Letters Patent, is—

1. The combination of the steam culinary vessel A, having cover C, with the interchangeable sections B B, separated from each other by the metallic supports $d\ d$, and arranged substantially as and for the purposes set forth.

2. The metallic supports $d\ d$, which are attached to the interchangeable sections B B, to keep them separate from each other for the admission of steam to their contents, to retain them in position when in use, and to serve as feet when used as dishes apart from the culinary vessel, substantially in the manner above described.

In testimony that I claim the foregoing as my own I affix my signature in presence of two witnesses.

ORVILLE S. BLISS.

Witnesses:
   CHARLES E. ALLEN,
   W. J. VAN PATTEN.